United States Patent [19]

Grossman

[11] Patent Number: 5,267,284
[45] Date of Patent: * Nov. 30, 1993

[54] ZIRCONIUM ALLOY CONTAINING ISOTOPIC ERBIUM

[75] Inventor: Leonard N. Grossman, Herculanean, Mo.

[73] Assignee: Combustion Engineering Inc., Windsor, Conn.

[*] Notice: The portion of the term of this patent subsequent to Aug. 31, 2010 has been disclaimed.

[21] Appl. No.: 906,351

[22] Filed: Jun. 30, 1992

[51] Int. Cl.$^5$ .................................................. G21C 7/04
[52] U.S. Cl. .................................... 376/339; 376/419; 420/422
[58] Field of Search ............... 376/260, 261, 339, 419, 376/457; 420/422; 148/672

[56] References Cited

U.S. PATENT DOCUMENTS 4,186,050  1/1980  West et al. ........................... 376/419

OTHER PUBLICATIONS

Metallurgical Progress Report, No. 3, pp. 33–38 (1959).
A Guide to Nuclear Power Technology, pp. 429–438, 1984.

Primary Examiner—Daniel D. Wasil
Attorney, Agent, or Firm—Ronald P. Kananen; John H. Mulholland

[57] ABSTRACT

A zirconium alloy absorber material is described which can be used in structural components in light water nuclear reactors. The zirconium alloy absorber material includes a zirconium alloy material, such as Zircaloy-2 or Zircaloy-4, which has been modified by the addition of isotopically pure erbium-167 in an amount ranging from about 0.1 to about 0.4 wt. %, and preferably about 0.2 wt. %.

6 Claims, No Drawings

ZIRCONIUM ALLOY CONTAINING ISOTOPIC ERBIUM

FIELD OF THE INVENTION

This invention relates to alloys for use in light water nuclear reactor (LWR) core structural components and fuel rod cladding tubes. More particularly, this invention relates to burnable-absorber-containing zirconium alloys that do not displace fissile materials in reactor cores, while at the same time providing adequate strength and corrosion resistance for its intended application. Still more particularly, this invention relates to zirconium alloys that contain isotopically purified, erbium-167 as a burnable absorber.

BACKGROUND OF THE INVENTION

General background materials on fuel rods, claddings and absorber materials are available. See, e.g., Frank J. Rahn et al., *A Guide to Nuclear Power Technology*, pp. 429–438 (1984).

In light water reactor (LWR) designs, fuel is formed into oxide pellets, which consist of uranium oxide or mixed uranium/plutonium oxide. These pellets are then placed in long tubes called cladding tubes to form fuel rods. The cladding tube forms a barrier against radioactive fission products released in the fuel pellets during irradiation. Proper fuel design requires an economical fuel cycle, while providing the necessary fuel characteristics for safe plant operation. Thus structural materials must be selected that have low neutron cross-section and low cost, while providing adequate mechanical corrosion resistance characteristics. Fuel assembly design should accordingly allow for the operation of the reactor at the design power and for the highest possible burn-up without breaching the cladding and releasing radioactive products to the primary coolant.

Zirconium alloys are used in fuel designs because they combine desirable nuclear, physical and mechanical properties. Because nuclear-grade zirconium is expensive, its alloys are used only in the active zone of the nuclear core where its neutron economy is most advantageous. Zircaloy-2 and Zircaloy-4 are two slightly different alloys which were developed for nuclear applications. Zircaloy-2 typically contains about 1.4 wt. % tin, 0.15 wt. % iron, 0.1 wt. % chromium and 0.06 wt. % nickel, 1,000 ppm oxygen and the balance zirconium. Zircaloy-4 typically contains about 1.4 wt. % tin, 0.21 wt. % iron, 0.11 wt. % chromium, 30 ppm nickel, 1,200 ppm oxygen and the balance zirconium. Zircaloy-2 has a small content of nickel, while in Zircaloy-4 the nickel content is essentially replaced by iron. This small change in composition reduces the hydrogen absorption rate during service in high-temperature water. The physical and mechanical properties of the two alloys are nearly identical.

Pressurized water reactor (PWR) fuel rods are typically made with Zircaloy-4 cladding, while boiling water reactor (BWR) fuel rods utilize Zircaloy-2. However, the channel in a BWR containing the fuel assembly is typically made of Zircaloy-4. Lower and upper tie plates are typically fabricated from type 304 stainless steel. The spacer grids, which keep proper distance between rods along the length of the fuel assembly, are usually made of Zircaloy-4. The end grids, however, are typically made of Inconel-718, chosen for its high corrosion resistance and high strength. Guide thimbles, for the insertion of control rods, are also typically made of Zircaloy-4.

Continuous operation of a reactor requires that the core remain critical. However, to compensate for the gradual depletion of fissile material with time, as burn-up accumulates, and to compensate for other phenomena such as the buildup of fission products, excess reactivity must be built into the nuclear core. This excess reactivity must be controlled at any given time to keep the reactor critical for steady-state operation. This task is accomplished by the use of materials that are strong neutron absorbers or "poisons." Control elements constructed from neutron absorbers regulate power generation according to demand, provide quick shutdown, account for short-term and long-term reactivity changes that result from temperature changes, and adjust for fission product accumulation and fissile material depletion.

The foremost characteristic of a control material is its neutron absorption properties. These vary with the energy of the impinging neutrons but one can gather together the detailed absorption features into a "thermal absorption cross-section," which is of interest in LWR's. The dominant absorber used in control rods in LWR's is boron.

In addition to the movable control rods used in all LWR'S, present LWR designs utilize burnable poisons. These are solid neutron absorbers which are placed in the reactor. As it is subjected to neutron irradiation, the burnable absorber material is gradually depleted. Thus the depletion of the burnable poison corresponds, roughly, to the depletion of fissile material. Burnable-poisons are used to counterbalance excess reactivity at the beginning of the fuel cycle and to provide a means for power shaping and optimum core burn-up. Burnable poison compounds currently of interest include boron, erbium and gadolinium.

Many LWR fuel designs employ burnable absorber rods to control axial power peaking or moderator temperature coefficient in a number of ways. In some designs, burnable absorber rods are placed in fuel assembly lattice locations, thereby displacing fuel rods. Other designs employ burnable absorber rod inserts and fuel assembly guide thimbles. Still other designs involve the formation of burnable-absorber coatings on the inside diameters of cladding tubes, on fuel pellet surfaces, or involve distribution of the burnable absorber within the fuel pellet.

Ideally, it would be desirable to directly include the burnable absorber materials in the reactor structural components to prevent displacement of the nuclear fuel. The use of erbium, boron or gadolinium, however, may tend to compromise the corrosion resistence of the zirconium alloys.

Accordingly, it is a continuing problem in this art to develop an absorber material which can be used as a structural component, while exhibiting adequate corrosion resistance.

SUMMARY OF THE INVENTION

In view of the foregoing, it is an object of the present invention to provide a burnable absorber that does not displace any fissile material from the fuel rods so that a higher fissile material inventory is available to produce power.

It is another object of the present invention to incorporate burnable absorber materials in zirconium bearing structural components which would allow such components to be fabricated in facilities that do not require radiological material handling capabilities or licenses.

It is a further object of the present invention to use one or more of boron-10, gadolinium-157 and erbium-167 as burnable absorber materials in zirconium alloy structural components.

The present invention thus provides erbium-167 as a burnable absorber in zirconium alloy structural components in amounts ranging from about 0.1 to 0.4 weight percent (wt. %), preferably about 0.2 wt. %.

DESCRIPTION OF THE PREFERRED EMBODIMENTS

Erbium, gadolinium and boron are three burnable absorbers that are typically used for LWR applications. In their naturally occurring state, each of these elements contains two or more distinct isotopes. Each of these isotopes has a different thermal neutron capture cross-section. Thus, the effectiveness of the burnable absorber can be increased by isolating those burnable absorber isotopes having a high absorption cross-section. For example, boron-10, gadolinium-157 and erbium-167 have desirable thermal absorption cross-sections.

Specific methods are available for removal of a single isotope from an isotopic mixture. For example, desirable isotopes may be isolated by fractionation of the material using commonly known techniques such as gas diffusion, centrifugal separation, liquid chromatography, and fractional distillation. Another method is atomic vapor laser isotope separation (AVLIS). AVLIS was developed for large scale uranium enrichment applications at the Lawrence Livermore National Laboratory. AVLIS works by first heating and vaporizing a sample of interest followed by laser irradiation at a wavelength specifically selected to ionize only the selected isotope. Once ionized, the isotope is isolated using electric fields.

Erbium, which has been isotopically depleted in the 166 isotope, and gadolinium, which has been isotopically depleted in the 156 isotope, were recently disclosed by Grossman et al. as favored additives for uranium dioxide fuel pellets in co-pending U.S. Ser. No. 07/761,438.

The present invention relates to the fabrication and use of zirconium alloy structural components in LWR's which preferably contain isotopically purified erbium-167 as a minor constituent. Erbium has been under consideration as a burnable absorber because it was found, by calculation, to have certain advantages over boron and gadolinium. Very recent reactor test results using uranium dioxide fuel with erbium included in the fuel pellets have supported these calculations.

Typically, erbium is included in the fuel pellets in concentrations of about 1.5 wt. % in about 20 wt. % of the uranium dioxide. This means that the overall weight ratio of erbium to uranium in the reactor core is about 0.3 wt. %. For a typical core design, the weight ratio of zirconium to uranium is about 30 wt. %. Thus, the weight ratio of erbium to zirconium in the core is about 1 wt. %. Furthermore, since erbium-167 comprises about 22.9 wt. % of naturally occurring erbium, the weight ratio of erbium-167 to zirconium is about 0.2 wt. % or 2,000 ppm. Therefore, to provide adequate reactor hold-down characteristics, erbium-167 should be introduced into the zirconium alloy components of the reactor core in an overall concentration of about 0.2 wt. %. At these low levels, any adverse effects that erbium-167 may have on the corrosion of the zirconium alloy will be minimized, while at the same time providing the desired burnable absorber benefits.

Therefore, according to an embodiment of the present invention, erbium-167 is substituted for zirconium and/or other appropriate elements in the zirconium alloys in an amount ranging from about 0.1 wt. % to about 0.4 wt. %, preferably about 0.2 wt. %. According to an embodiment of the present invention, about 0.1 to 0.4 weight parts isotopically purified erbium-167 are homogeneously combined with about 100 weight parts of a zirconium alloy to form a zirconium alloy absorber material.

As discussed above, the two zirconium alloys commonly used in reactor design are Zircaloy-2 and Zircaloy-4. Of course, other zirconium alloys could be used in the practice of the present invention as long as they meet the stringent requirement associated with reactor core conditions. The uniform use of isotopic erbium-167 in all or most of the zirconium alloy components in the core avoids the disadvantages associated with the use of more than one type of zirconium alloy.

In addition to zirconium alloys containing erbium-167, equivalent levels of isotopically pure gadolinium-157, equivalent levels of isotopically pure boron-10 or equivalent combinations of two or all three pure isotopes can be used in concentrations appropriate for effective burnable absorber service.

Thus, a zirconium alloy absorber material is provided which does not displace fissile material in the reactor core. Furthermore, since isotopically purified absorber materials are introduced into zirconium alloy components throughout the reactor core, the burnable absorber concentration is held to a minimum.

I claim:

1. A zirconium alloy absorber material comprising about 100 parts by weight zirconium alloy and about 0.1 to 0.4 parts by weight isotopically purified erbium-167.

2. The zirconium alloy absorber material of claim 1, wherein the erbium-167 is provided in an amount equal to about 0.2 parts by weight.

3. The zirconium alloy absorber material of claim 1, wherein the zirconium alloy is selected from the group consisting of Zircaloy-2 and Zircaloy-4.

4. A method of making a zirconium alloy absorber material comprising the steps of:
   providing a zirconium alloy;
   providing isotopically purified erbium-167; and
   homogeneously combining about 100 weight parts of the zirconium alloy and about 0.1 to 0.4 weight parts of the erbium-167 to form a zirconium alloy absorber material.

5. The method of claim 4, wherein the erbium-167 is provided in an amount equal to about 0.2 weight parts.

6. The method of claim 4, wherein the zirconium alloy is selected from the group consisting of Zircaloy-2 and Zircaloy-4.

* * * * *